Patented Aug. 31, 1943

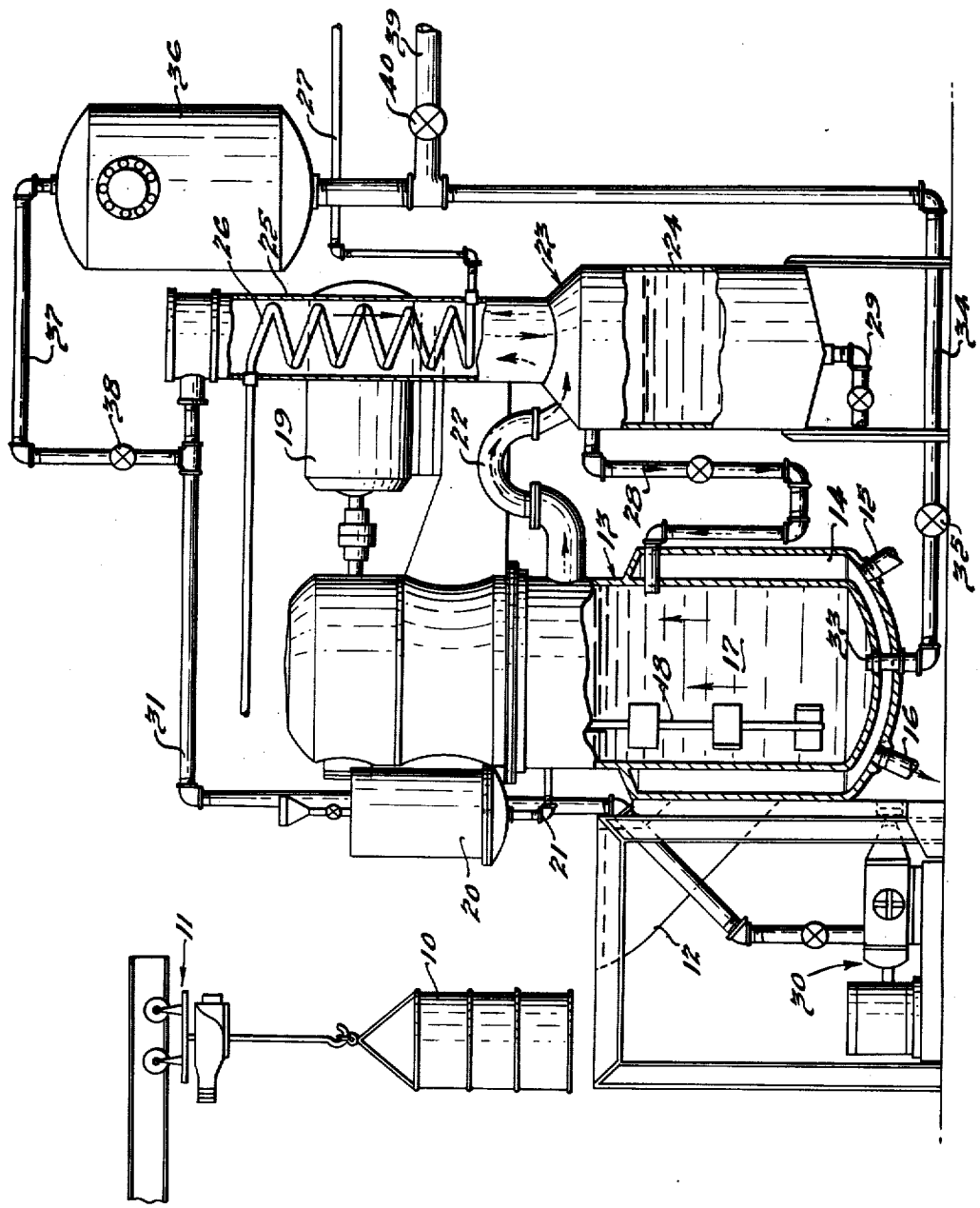

2,328,399

UNITED STATES PATENT OFFICE 2,328,399

COATING MATERIAL RECOVERY MEDIUM AND PROCESS

Seymour G. Saunders, Bloomfield Hills, and Harry Morrison, Detroit, Mich., assignors to Chrysler Corporation, Highland Park, Mich., a corporation of Delaware Application September 10, 1941, Serial No. 410,268

1 Claim. (Cl. 106—287)

This invention relates to an improved apparatus and process for reconditioning recovered solids of excess sprayed coating materials which have been collected in a recovery medium mainly comprising water.

More particularly, the invention pertains to a process for the removal of water or other recovery medium from recovered excess sprayed coating material whereby the latter is conditioned for reuse.

One of the main objects of the invention is to provide an efficient and economical process and apparatus for removing recovery medium from collected excess sprayed coating material which has been collected in accordance with the disclosures in Patents Nos. 2,086,514 and 2,208,646 issued July 6, 1937 and July 23, 1940, respectively for an improvement in coating material recovery process.

Another object of the invention is the provision of a process of this character which operates efficiently at maximum temperatures far below the boiling temperature of water.

A further object of the invention is the provision of a process of this kind during which the solids are incorporated for reuse in the vehicle or solvent in which such coating material solids are conventionally used.

A still further object of the invention is the utilization in a process of this kind of the same solvent for the purpose of extracting occluded water from the solids as is conventionally used in reducing the latter to a sprayable consistency.

An additional object of the invention is the provision in a process of this character for the reuse, in a continuous repeating cycle, of the fraction of solvent utilized to extract the occluded water from the solvents.

An illustrative embodiment of the invention is shown in the accompanying drawing in which the figure is a diagrammatic side elevational view, partly in section, of apparatus for separating recovery medium from recovered solids of excess sprayed coating material in accordance with the invention.

In general, excess sprayed coating materials are collected by directing the discharge from a spray gun which misses the work upon a curtain or spray of liquid, such as water, in which is included ingredients that have for their purpose the rendering of the collected particles of excess sprayed coating material non-adhesive to the walls of a structure in which they are confined. Various examples of suitable recovery mediums of this kind are set forth in the above mentioned patents. When the particles of excess sprayed coating material are precipitated or otherwise deposited in such form that they collect as a sludge at the bottom of a settling tank or accumulate in scum-like formation on the surface of the liquid of the tank, depending upon the nature of the coating material and recovery medium. The term "solids" as used herein and as conventionally employed in the surface coating art refers to those portions of surface coating material which remain, either in their initial or chemically altered form, in a normally set deposit of such coating materials, including the non-volatile vehicle and pigment.

In the practice of our improved process and apparatus for reconditioning the above collected studge, the latter is removed from the settling tank and conveyed in a bucket 10 by conveyor mechanism, generally designated by the numeral 11, to a hopper 12 which discharges the sludge into the interior of a mixing tank generally designated by the numeral 13. The mixing tank 13 is provided with a steam jacket 14 or other suitable means by which it may be heated. Steam is admitted to the jacket through an inlet pipe 15, circulated therethrough and discharged from the jacket through an outlet pipe 16. Disposed in the inner chamber 17 of the mixing tank are suitable mixers 18 which are driven by a motor 19. An auxiliary solvent container 20 is connected by a pipe 21 with the inner chamber 17 of the mixing tank for the purpose of supplying a suitable solvent thereto. The solvent employed in this process preferably comprises the same solvent or vehicle which is conventionally used in the finished coating material of the type being operated upon. High solvent naphtha, toluol, mixtures of toluol and naphtha, xylol, and mixtures of naphtha of different boiling points are examples of suitable solids which may be used for this purpose. A small amount of butyl alcohol may be added to the solvent for the purpose of protecting certain resins against detrimental effect by heat during the distillation step. The solvent employed should have the property of mixing with water to form a mixture which upon heating is vaporized and distilled from the mixing tank 13 in the form of a mixture of solvent and water vapor.

The upper end portion of the inner chamber 17 of the mixing tank 13 is connected by a conduit 22 with a combined condenser and settling tank unit generally designated by the numeral 23 which has an enlarged lower settling tank portion and a smaller diameter condensing chamber 25 disposed thereabove. A cooling coil 26 is provided in the condensing chamber 25 and connected with a source of cooling water (not shown) by a pipe 27. When the mixture of water and solvent vapors enters the condensing unit 23, it flows upwardly into the condensing chamber 25 where it is cooled and precipitated. The condensate thus formed drips into the settling tank 24 and separates into two layers, the solvent accumulating in the upper layer and water in the lower layer. An overflow pipe 28 leading from the upper end portion of the settling tank 24 conveys overflowing solvent from the latter tank to the inner chamber 17 of the mixing tank 13 so as to continuously replenish the solvent content in the latter chamber. The water accumulated in the bottom of the settling tank 24 may be drained off and discharged into a sewer through an outlet pipe 29.

In order to facilitate removal of water from the sludge deposited in the mixing tank 13, at a temperature substantially below the boiling point of water, the pressure in the mixing tank 13 above the liquid level therein and the pressure in the condenser chamber 25 is maintained below atmospheric pressure by applying a vacuum which is produced by a suitable vacuum pump mechanism generally designated by the numeral 30. The vacuum pump is connected with the upper end portion of the condensing chamber 25 by a pipe 31 and the vacuum is applied on the interior of the mixing tank 13 through the vapor outlet conduit 22.

The inner chamber 17 of the mixing tank 13 is provided with a coating material outlet 33 which is connected by a pipe 34 having a valve 35 therein with a storage tank 36. The storage tank 36 is connected at its upper end with the vacuum line 31 by a pipe 37 having a valve 38 therein. By virtue of this connection between the storage tank 36 and the vacuum line 31, the vacuum applied on the condenser and mixing tank may be utilized to withdraw dissolved coating material solids which have been thoroughly mixed with solvent and from which occluded water has been extracted from the chamber 17 of the tank 13 and to deliver it to the storage tank. This may be accomplished by opening valves 35 and 38. When the valves 35 and 38 are closed, the coating material contained in the tank 36 may be supplied for reuse or for shipment in containers through an outlet pipe 39 having a control valve 40 therein.

The viscosity of the reconditioned coating material withdrawn from the tank 13 may be predetermined by controlling the amount of solvent added but it is preferable to maintain the viscosity of the coating material discharged from the tank 13 at a much higher viscosity than that normally used in the application of coating material. This product may be thinned to a desired viscosity by the further addition of solvents and vehicles by the user.

In the practice of the foregoing process, the occluded water content of the sludge delivered to the apparatus by the bucket 10 and any water remaining therein after a rough settling operation of the main bulk of the recovery medium from the sludge is removed therefrom and the sludge is simultaneously incorporated in a homogeneous mixing operation in the solvent which later serves as the vehicle for the reconditioned coating material solids. The temperature required to drive off the water is much lower than that which has a detrimental effect upon the coating material. That portion of the solvent which was utilized to extract water is collected and returned to the tank 13 for reuse in a continuous and repeating cycle.

Although but one specific embodiment of the invention is herein shown and described, it will be understood that various changes in the sequence of operations, steps and materials employed may be made without departing from the spirit of the invention.

We claim:

The method of reconditioning recovered solids of excess sprayed coating material and separating therefrom residual water introduced during its collections which consists in dissolving in a mixing chamber said water contaminated solids in a liquid solvent having a lower boiling point than water and of the same kind as that normally used in the application of the coating material, distilling said water together with a portion of the solvent in said mixing chamber from said solution under heat and vacuum at a temperature below the boiling point of water, condensing the resulting distillate, separating the water and solvent of said condensate, returning said condensed solvent to said solution of coating material solids while the latter is undergoing water extraction in a continuous process for repetition of said vacuum distillation water removal, and periodically removing from said mixing chamber portions of the resulting solution of water-free coating material in said normally usable solvent and replenishing said chamber with water contaminated solids without interrupting said vaccum distillation water removal operation.

SEYMOUR G. SAUNDERS.
HARRY MORRISON.